(12) United States Patent
Greenwood et al.

(10) Patent No.: US 8,998,286 B2
(45) Date of Patent: Apr. 7, 2015

(54) SOLDIER SUPPORT SYSTEM IN A VEHICLE

(71) Applicant: Black Mountain Industries, Inc., Bryan, TX (US)

(72) Inventors: Kyle L. Greenwood, Bryan, TX (US); Bobby D. Melvin, Bryan, TX (US); Rattaya C. Yalamanchili, Houston, TX (US); James Buckner, Bryan, TX (US); James Hagan, Bryan, TX (US)

(73) Assignee: Black Mountain Industries, Inc., Bryan, TX (US)

( * ) Notice: Subject to any disclaimer, the term of this patent is extended or adjusted under 35 U.S.C. 154(b) by 0 days.

(21) Appl. No.: 13/631,976

(22) Filed: Sep. 29, 2012

(65) Prior Publication Data

US 2013/0270879 A1 Oct. 17, 2013

Related U.S. Application Data

(63) Continuation-in-part of application No. 13/368,773, filed on Feb. 8, 2012, which is a continuation of application No. 12/246,237, filed on Oct. 6, 2008, now Pat. No. 8,132,838.

(51) Int. Cl.
*B60R 22/00* (2006.01)
*F41H 7/04* (2006.01)
*B60N 2/16* (2006.01)
(Continued)

(52) U.S. Cl.
CPC ................ *F41H 7/046* (2013.01); *B60R 22/30* (2013.01); *B60N 2/4242* (2013.01); *B60N 2/42736* (2013.01)

(58) Field of Classification Search
USPC ............. 296/68.1, 63, 65.03, 65.02; 297/483, 297/465, 468, 344.12, 344.18, 474, 486
See application file for complete search history.

(56) References Cited

U.S. PATENT DOCUMENTS 228,518 A 6/1880 Dawes
298,625 A 5/1884 Saunders
(Continued)

FOREIGN PATENT DOCUMENTS

GB 2406078 3/2005
WO 2006022880 3/2006

OTHER PUBLICATIONS

PCT International Search Report for International Application No. PCT/US09/59471 dated Mar. 8, 2010.
(Continued)

*Primary Examiner* — Glenn Dayoan
*Assistant Examiner* — Sunsurraye Westbrook
(74) *Attorney, Agent, or Firm* — Tumey L.L.P.

(57) ABSTRACT

A soldier restraint system and method secure a soldier in a vehicle. In one embodiment, the soldier restraint system includes a seat assembly comprising a seat and straps. The soldier restraint system also includes a restraint harness belt. The restraint harness belt is secured to the seat assembly. In addition, the soldier restraint system includes mounting assemblies. The straps attach the seat to the mounting assemblies. The mounting assemblies are securable to the vehicle. Attachment of at least one of the straps to the seat is releasable by a release assembly. The soldier restraint system also includes a strap retractor and a retractor strap. The retractor strap is extractable from the strap retractor. The retractor strap is retractable by the strap retractor. The strap retractor retracts the retractor strap upon achieving a strap threshold.

20 Claims, 12 Drawing Sheets

(51) Int. Cl.
   *B60R 22/30* (2006.01)
   *B60N 2/42* (2006.01)
   *B60N 2/427* (2006.01)

(56) References Cited

U.S. PATENT DOCUMENTS

| | | | |
|---|---|---|---|
| 1,242,024 | A | 10/1917 | Nichols |
| 1,518,600 | A | 12/1924 | Nolen |
| 2,442,375 | A * | 6/1948 | Paxton ............... 244/122 R |
| 2,527,905 | A | 10/1950 | Barecki |
| 2,556,076 | A | 6/1951 | Evans et al. |
| 2,829,702 | A | 4/1958 | Keating |
| 2,834,401 | A | 5/1958 | Tanner |
| 2,935,120 | A | 5/1960 | Naus |
| 3,184,205 | A | 5/1965 | Carpezzi |
| 3,314,720 | A | 4/1967 | Millington et. al. |
| 3,625,563 | A | 12/1971 | Dickinson et al. |
| 3,653,715 | A | 4/1972 | Drabert et al. |
| 3,659,844 | A | 5/1972 | Cummins |
| 3,868,143 | A | 2/1975 | Reilly |
| 3,954,041 | A | 5/1976 | Mechulam et al. |
| 4,099,778 | A | 7/1978 | Lehr |
| 4,119,044 | A | 10/1978 | Hines |
| 4,139,215 | A | 2/1979 | Guitard et al. |
| 4,474,347 | A | 10/1984 | Mazelsky |
| 4,602,816 | A | 7/1986 | Chandler |
| 4,738,413 | A | 4/1988 | Spinosa et al. |
| 4,822,224 | A | 4/1989 | Carl et al. |
| 4,836,480 | A | 6/1989 | Besner |
| 4,856,747 | A | 8/1989 | Gano |
| 4,923,147 | A | 5/1990 | Adams et al. |
| 4,927,211 | A * | 5/1990 | Bolcerek ............... 297/465 |
| 5,010,850 | A | 4/1991 | Sailer |
| 5,015,010 | A * | 5/1991 | Homeier et al. ............ 280/808 |
| 5,039,054 | A | 8/1991 | Pai |
| 5,176,402 | A | 1/1993 | Coulon |
| 5,180,131 | A | 1/1993 | Few |
| 5,259,478 | A | 11/1993 | Berish et al. |
| 5,397,171 | A * | 3/1995 | Leach ............... 297/484 |
| 5,533,934 | A | 7/1996 | Miller |
| 5,577,806 | A | 11/1996 | Ugalde |
| 5,642,916 | A | 7/1997 | Dybro et al. |
| 5,839,965 | A | 11/1998 | Mullins |
| 6,142,567 | A | 11/2000 | Bentley |
| D439,062 | S | 3/2001 | McGinnis et al. |
| 6,322,140 | B1 * | 11/2001 | Jessup et al. ............ 297/216.17 |
| 6,409,243 | B1 | 6/2002 | Hansen |
| 6,467,576 | B2 | 10/2002 | Figura et al. |
| 6,481,777 | B2 | 11/2002 | Mans |
| 6,719,258 | B2 | 4/2004 | Bryngelson et al. |
| 6,725,855 | B1 | 4/2004 | Brennan |
| 6,913,314 | B2 | 7/2005 | Hansen |
| 7,100,991 | B2 | 9/2006 | Schroth |
| 7,175,233 | B2 | 2/2007 | Greenwood et al. |
| 7,269,963 | B2 | 9/2007 | Yonekura |
| 7,290,742 | B2 | 11/2007 | Wang |
| 7,293,818 | B2 | 11/2007 | Kumpf et al. |
| 7,413,247 | B2 | 8/2008 | Van Druff et al. |
| 7,758,095 | B2 | 7/2010 | Elhanany |
| 7,815,255 | B1 | 10/2010 | Kiel et al. |
| 8,011,730 | B2 | 9/2011 | Greenwood |
| 2004/0108165 | A1 | 6/2004 | Poole et al. |
| 2006/0207021 | A1 | 9/2006 | Brunson et al. |
| 2007/0096526 | A1 | 5/2007 | Hentges |
| 2007/0281125 | A1 | 12/2007 | Moore et al. |
| 2010/0084897 | A1 | 4/2010 | Greenwood |
| 2010/0084907 | A1 | 4/2010 | Greenwood et al. |

OTHER PUBLICATIONS

PCT International Search Report for International Application No. PCT/US09/59469 dated Mar. 11, 2010.
PCT International Search Report for International Application No. PCT/US09/59470 dated Apr. 26, 2010.
USPTO Office action for U.S. Appl. No. 12/246,237 dated May 24, 2011.
USPTO Supplemental Notice of Allowability for U.S. Appl. No. 12/246,471 dated Jun. 8, 2011.
USPTO Notice of Allowance for U.S. Appl. No. 12/246,471 dated Apr. 27, 2011.
PCT International Preliminary Report on Patentability (Chapter 1) for International Application No. PCT/US2009/059469 dated Apr. 12, 2011.
PCT International Preliminary Report on Patentability (Chapter 1) for International Application No. PCT/US2009/059470 dated Apr. 12, 2011.
PCT International Preliminary Report on Patentability (Chapter 1) for International Application No. PCT/US2009/059471 dated Apr. 12, 2011.
USPTO Office Action for U.S. Appl. No. 12/246,237 dated Oct. 14, 2010.
USPTO Office Action for U.S. Appl. No. 12/246,471 dated Sep. 28, 2010.
USPTO Office Action for U.S. Appl. No. 12/245,861 dated Jun. 18, 2012.
USPTO Office Action for U.S. Appl. No. 13/191,904 dated Oct. 18, 2011.
Notice of Allowance for U.S. Appl. No. 12/246,237 dated Nov. 8, 2011.
USPTO Office Action for U.S. Appl. No. 12/245,861 dated Jun. 22, 2011.
USPTO Office Action for U.S. Appl. No. 12/245,861 dated Oct. 25, 2011.
USPTO Office Action for U.S. Appl. No. 12/245,861 dated Feb. 9, 2012.
EPO search report for U.S. Appl. No. 09819694.2 dated Apr. 23, 2012.
EPO Supplemental Search Report for Application No. 09819694.2 dated May 11, 2012.
USPTO Office Action for U.S. Appl. No. 12/245,861 dated Nov. 27, 2012.
USPTO Office Action for U.S. Appl. No. 13/368,773 dated Oct. 24, 2012.
Notice of Allowance for U.S. Appl. No. 13/191,904 dated Apr. 12, 2012.
European Search Report and Written Opinion for EU Application No. EP 09819695 dated Apr. 2, 2013.
USPTO Office Action for U.S. Appl. No. 14/064,038 dated May 6, 2014.
USPTO Final Office Action for U.S. Appl. No. 13/368,773 dated Apr. 9, 2014.
USPTO Office Action for U.S. Appl. No. 13/631,979 dated Apr. 17, 2014.
Notice of Allowance for U.S. Appl. No. 13/191,899 dated Jan. 30, 2014.
Notice of Allowance for U.S. Appl. No. 13/550,389 dated Jan. 24, 2014.

* cited by examiner

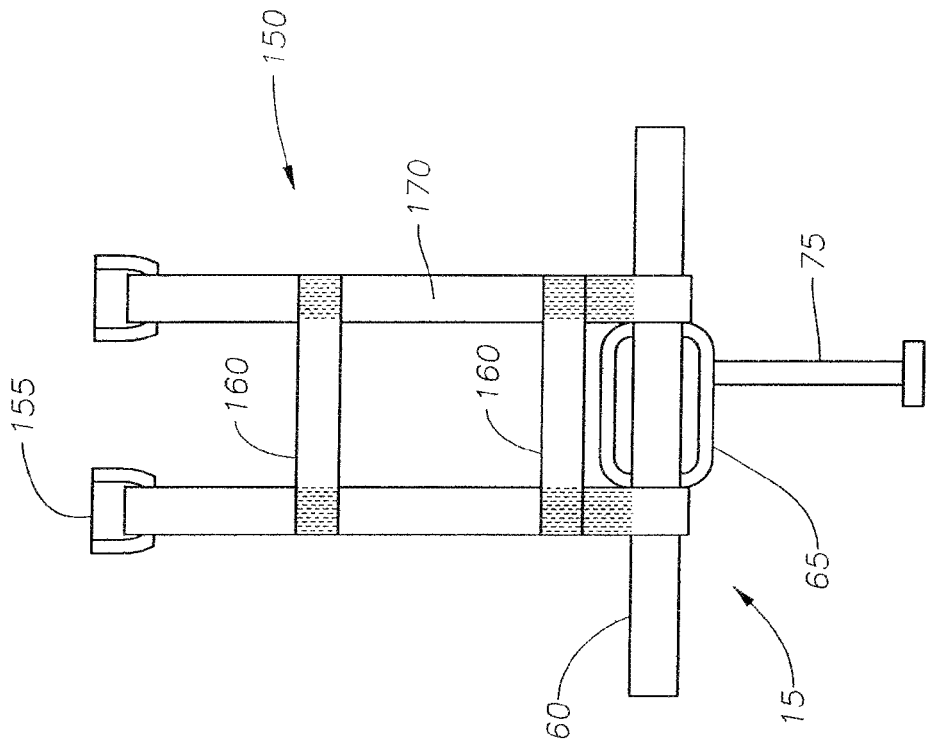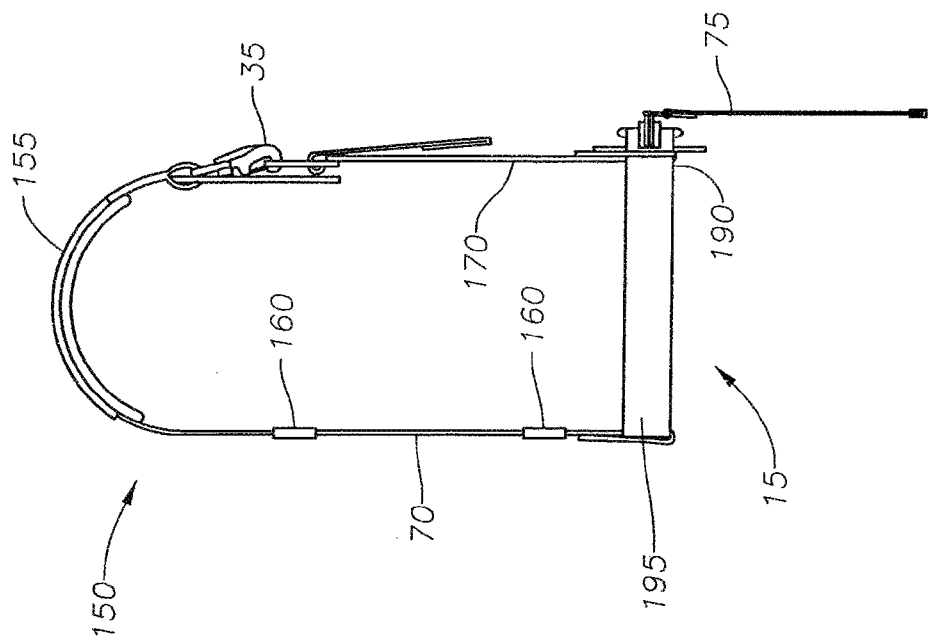

SOLDIER SUPPORT SYSTEM IN A VEHICLE

CROSS-REFERENCE TO RELATED APPLICATIONS

This application is a continuation-in-part of U.S. application Ser. No. 13/368,773 filed Feb. 8, 2012 that is a continuation of U.S. application Ser. No. 12/246,237 filed Oct. 6, 2008 and now issued as U.S. Pat. No. 8,132,838 on Mar. 13, 2012, which are all herein incorporated by reference in their entirety.

STATEMENT REGARDING FEDERALLY SPONSORED RESEARCH OR DEVELOPMENT

Not applicable.

BACKGROUND OF THE INVENTION

1. Field of the Invention

This invention relates to the field of vehicle restraint systems and more specifically to soldier restraint systems in a vehicle.

2. Background of the Invention

Occupants of vehicles often need to be in an elevated position within the vehicle. For instance, in military vehicles, occupants of the military vehicles may need to expose the upper portion of the occupants' bodies outside of the vehicle. Such instances include the need to operate weaponry, improve vision outside of the military vehicle, and the like. Problems occur in such situations with fatigue involved with the individuals having to stand in such positions for long periods of time. Further problems include securing the occupant inside the vehicle during motion of the vehicle and also during a vehicle roll over to prevent injury of the occupant.

Consequently, there is a need for a restraint system to protect soldiers in a vehicle. Additional needs include an improved restraint system that secures an occupant in a vehicle and that also provides a seat to the occupant.

BRIEF SUMMARY OF SOME OF THE PREFERRED EMBODIMENTS

These and other needs in the art are addressed in one embodiment by a soldier restraint system secured in a vehicle such as a military vehicle. The soldier restraint system includes a seat assembly comprising a seat and straps. The soldier restraint system also includes a restraint harness belt. The restraint harness belt is secured to the seat assembly. In addition, the soldier restraint system includes mounting assemblies. The straps attach the seat to the mounting assemblies. The mounting assemblies are securable to the vehicle. The attachment of at least one of the straps to the seat is releasable by a release assembly. The soldier restraint system also includes a strap retractor and a retractor strap. The retractor strap is extractable from the strap retractor, and the retractor strap is retractable by the strap retractor. The strap retractor retracts the retractor strap upon achieving a strap threshold.

These and other needs in the art are addressed in another embodiment by a soldier restraint system in a vehicle. The soldier restraint system includes a seat assembly comprising a seat and straps. The soldier restraint system also includes a restraint harness belt. The restraint harness belt is secured to the seat assembly. In addition, the soldier restraint system includes mounting assemblies. The straps attach the seat to the mounting assemblies. The mounting assemblies are securable in the vehicle. Attachment of at least one of the straps to the seat is releasable by a release assembly. The soldier restraint system also includes one or more sections. The one or more sections comprise portions of folded strap.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which:

FIG. 10 illustrates a side view of a restraint harness belt and a shoulder harness;

FIG. 11 illustrates a back view of a restraint harness belt and a shoulder harness;

DETAILED DESCRIPTION OF THE PREFERRED EMBODIMENTS

Figure 1:
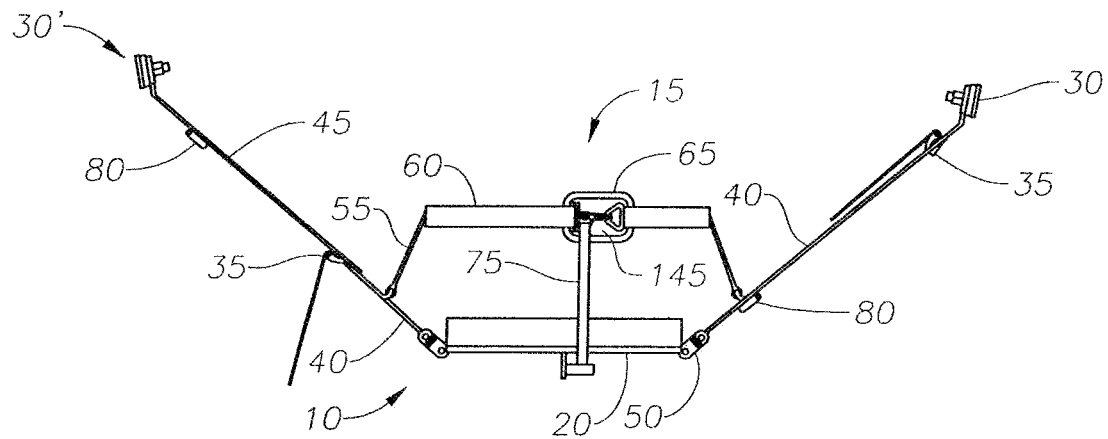
FIG. 1 illustrates a front view of a soldier restraint system having a seat assembly and a restraint harness belt.
Figure 2:
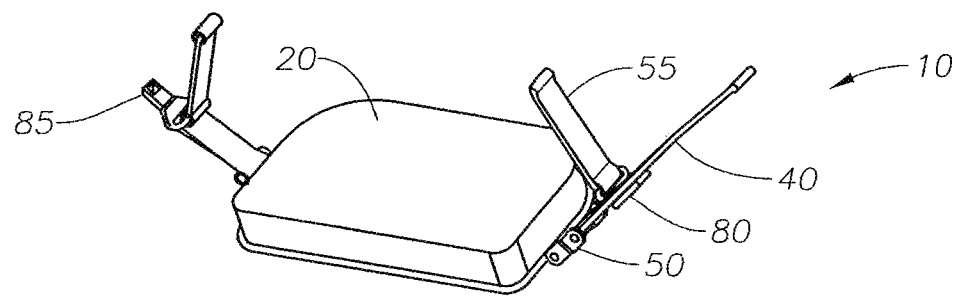
FIG. 2 illustrates a perspective view of a seat assembly.
Figure 3:
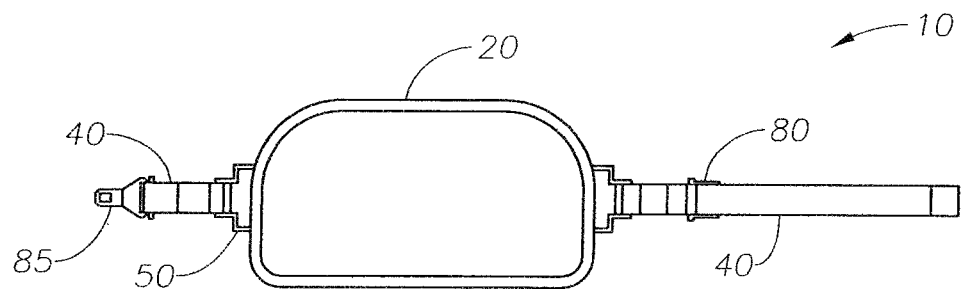
FIG. 3 illustrates a top view of a seat assembly.

FIG. 1 illustrates an embodiment of a soldier restraint system 5 that includes seat assembly 10 and restraint harness belt 15. Seat assembly 10 includes seat 20. Seat 20 may include any type of seat suitable for use in a vehicle. Seat 20 may also be composed of any material suitable for use in a vehicle. Without limitation, seat 20 may be composed of leather, plastic, nylon, and the like. In some embodiments, seat 20 includes a cushion. FIG. 2 illustrates a perspective view of an embodiment of seat 20. Seat 20 may have any configuration suitable for an individual (i.e., soldier) to sit upon. FIG. 3 illustrates a top view of an embodiment of seat 20. As illustrated, straps 40 are attached to seat 20. Straps 40 are attached to seat 20 by strap attachment means 50. Strap attachment means 50 include any means suitable for attaching straps 40 to seat 20. In embodiments as illustrated in FIGS. 1-3, strap attachment means 50 are brackets that allow straps 40 and seat 20 to swivel in relation to each other. Straps 40 may be composed of any material suitable for use in a vehicle such as nylon, leather, and the like. In some embodiments, straps 40 are suitably attached on opposing sides of seat 20 to provide balance to an individual sitting in seat 20. In embodiments as illustrated in FIGS. 1-3, two straps 40 are attached to seat 20. In alternative embodiments (not illustrated), more than two straps 40 are attached to seat 20. Mounting assemblies 30, 30' attach soldier restraint system 5 to the interior of the vehicle.

Figure 4:
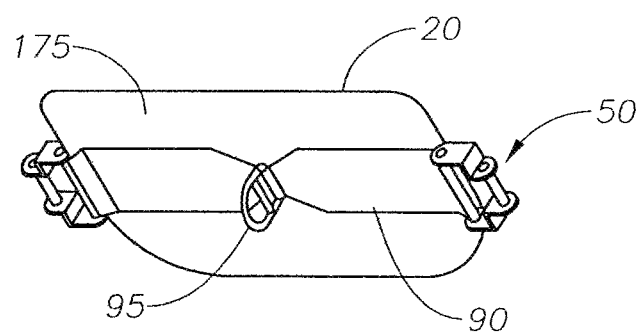
FIG. 4 illustrates a perspective bottom view of a seat assembly.

FIG. 4 illustrates a bottom perspective view of an embodiment of seat 20 in which seat 20 includes seat base strap 90. Seat base strap 90 includes base strap attachment means 95. Seat base strap 90 may be attached to bottom side 175 of seat 20 by any suitable means. In an embodiment as illustrated in FIG. 4, seat base strap 90 is attached to strap attachment means 50 and is disposed on bottom side 175. Base strap attachment means 95 includes any means suitable for securing seat 20 to another object such as the floor of the vehicle or a platform within the vehicle. In some embodiments, a strap (not illustrated) is secured to a platform in the vehicle and is attached to seat 20 at base strap attachment means 95. Sufficient tension is provided in the strap to prevent unwanted upward movement of seat 20 in the vehicle. For example, in an instance in which the vehicle rolls over, the tension in the strap attached to base strap attachment means 95 prevents seat 20 and an individual secured in seat 20 from harm by limiting the movement of seat 20. In an embodiment, seat base strap 90 has sufficient tension between the strap attachment means 50 to provide contact between seat base strap 90 and bottom side 175 and to not substantially lose the contact when secured to the strap.

In an embodiment as illustrated in FIG. 1, mounting assemblies 30, 30' are secured inside the vehicle. In some embodiments, mounting assemblies 30, 30' are secured to inside surfaces such as walls of the vehicle or a gun turret of the vehicle. FIG. 1 illustrates an embodiment of soldier restraint system 5 having mounting assemblies 30, 30' on opposing sides of seat 20. In embodiments as illustrated in FIG. 1, one mounting assembly 30 has an attached release assembly 35. The attached release assembly 35 is attached to a strap 40 that attaches mounting assembly 30 to seat 20. Strap 40 may be secured to seat 20 by any suitable means. In an embodiment as illustrated, strap 40 is secured to seat 20 by strap attachment means 50. Strap attachment means 50 includes any means suitable for attaching a strap to a seat. In an embodiment as shown, strap attachment means 50 is a bracket that swivels. Without limitation, a bracket that swivels allows limited motion of seat 20. In some embodiments, strap 40 includes adjusting means 80. Adjusting means 80 is any means suitable for adjusting the length of strap 40 between release assembly 35 and seat 20. The other mounting assembly 30' has an attached mounting strap 45 with a release assembly 35 attached on the opposing end of mounting strap 45 from mounting assembly 30'. In some embodiments, mounting strap 45 includes adjusting means 80. Seat 20 is attached to mounting assembly 30' by a strap 40 that attaches the release assembly 35 to seat 20. FIG. 1 illustrates an embodiment of soldier restraint system 5 that has two mounting assemblies 30, 30' but it is to be understood that soldier restraint system 5 is not limited to two mounting assemblies 30, 30' but in alternative embodiments (not illustrated) may have more than two mounting assemblies. Mounting assemblies 30, 30' are secured in the vehicle at a sufficient height to suspend seat 20 at a desirable height in the vehicle (i.e., from the floor or a platform in the vehicle). Adjusting means 80 allow the length of straps 40, 45 to be adjusted to adjust the suspension height of seat 20. Straps 40 attach seat 20 to release assemblies 35 by attachment means 85. Attachment means 85 may include any suitable means for attaching a strap to an object such as a hook, bracket, latch, and the like. Straps 40, 45 have a sufficient tension to facilitate suspension of seat 20 but in some embodiments also have a sufficient tension to allow the individual to have a desirable amount of movement while secured in seat 20. For instance, in an embodiment in which soldier restraint system 5 is secured in the vehicle to allow the individual to sit in a gun turret of the vehicle, the soldier may have a desire to move about in the interior when operating a weapon in a combat situation or to view outside the vehicle. Mounting assemblies 30, 30' may be secured in the vehicle at any degrees apart to provide a seat 20 of sufficient stability to allow an individual to sit in seat 20.

FIG. 1 illustrates an embodiment of soldier restraint system 5 in which one mounting assembly 30 has a release assembly 35 attached to the mounting assembly 30, and the other mounting assembly 30' has a release assembly 35 attached with a mounting strap 45 attached in between the mounting assembly 30' and the release assembly 35. Without limitation, the mounting assembly 30 has the release assembly 35 attached to provide a release assembly 35 at a sufficient proximity to the individual sitting in seat 20 to allow the individual to pull the release assembly 35 and quickly drop seat 20. Further, without limitation, the mounting assembly 30' has the release assembly at a lower position in relation to seat 20 to provide a release assembly 35 at a sufficient proximity to other individuals in the vehicle to pull the release assembly 35 and quickly drop seat 20. For instance, soldier restraint system 5 may be mounted in a gun turret of the vehicle wherein the soldier secured in soldier restraint system 5 has the upper portion of the soldier's body exposed outside of the vehicle. In a combat situation, the soldier secured in soldier restraint system 5 may desire to quickly drop down in the vehicle for protection by the vehicle. In such a situation, the release assembly 35 attached to mounting assembly 30 provides a convenient release assembly 35 by which the soldier may pull and release seat 20, thereby allowing the soldier to drop into the vehicle for protection. The soldier may also pull the release assembly 35 attached to the mounting assembly 30' with the mounting strap 45 in between, but, with seat 20 in an elevated position allowing the soldier to be positioned in the gun turret, the position of such release assembly 35 provides a convenient release for other soldiers in the vehicle to pull and release seat 20 to allow the soldier to drop into the vehicle for protection. For instance, the soldier may be injured and unable to pull a release strap 135, and such lower positioned release strap 135 allows the other soldiers to pull the release strap 135 and thereby allow the injured soldier to be quickly protected inside the vehicle. It is to be understood that soldier restraint system 5 is not limited to release assembly 35 attached to one mounting assembly 30 and another release assembly 35 disposed at a lower position in relation to seat 20. Soldier restraint system 5 may have release assemblies 35 disposed at any position in relation to seat 20. In an alternative embodiment (not illustrated), a mounting assembly 30 and/or 30' may have one release assembly 35 attached to the respective mounting assembly and at least one other release assembly 35 disposed between the one release assembly 35 and seat 20. In other alternative embodiments (not illustrated), both mounting assemblies 30, 30' have a release assembly 35 attached to the respective mounting assembly 30, 30'. In some alternative embodiments (not illustrated), both mounting assemblies 30, 30' have an attached release assembly 35 with a mounting strap 45 disposed between the respective mounting assembly and the release assembly 35. It is to be understood that when one release assembly 35 is pulled to release seat 20 from the respective mounting assembly 30 or 30', seat 20 remains secured to the other mounting assembly 30 or 30', which protects the individual secured in soldier restraint system 5 in the event of a roll over or injury from other motion of the vehicle.

Figure 5:
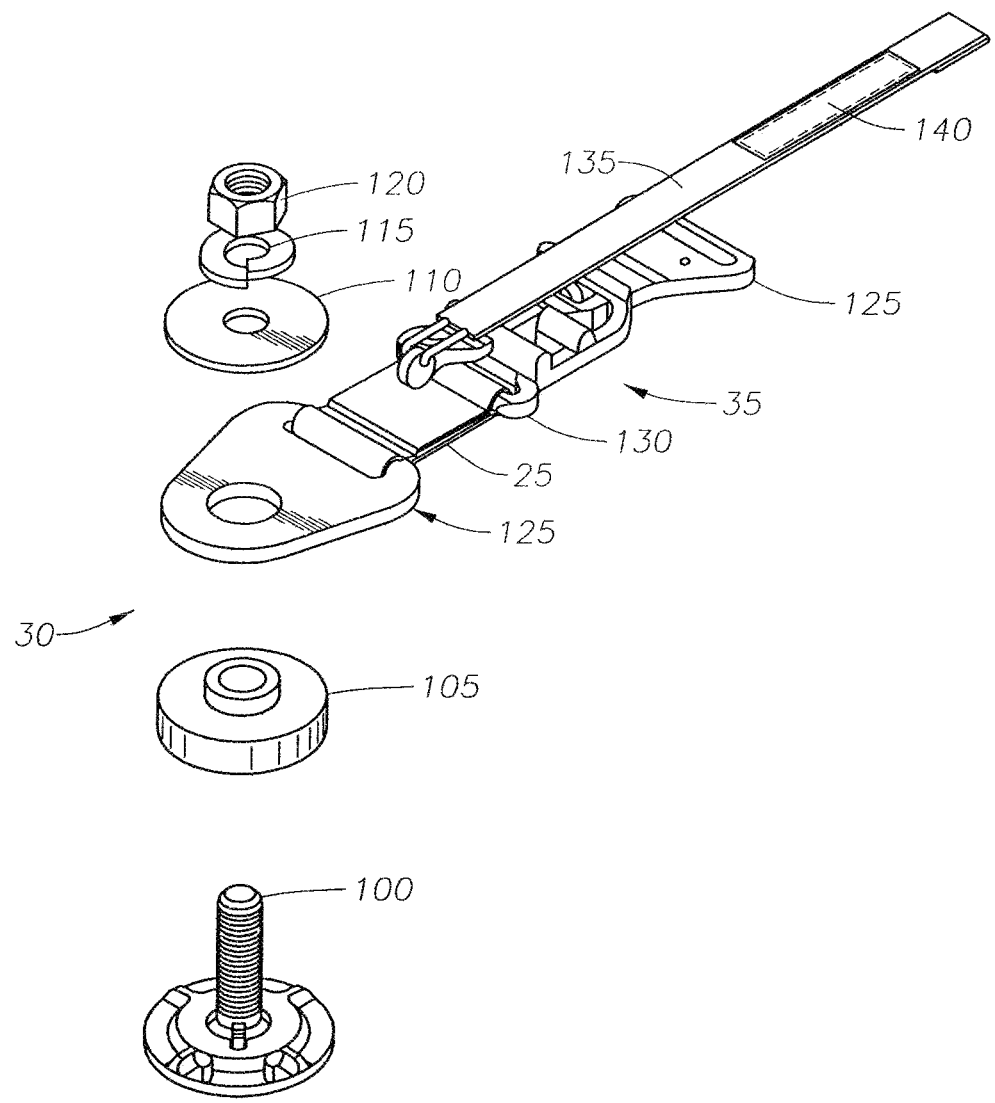
FIG. 5 illustrates a mounting assembly and a release assembly.

FIG. 5 illustrates an embodiment of a mounting assembly 30 with release assembly 35 attached. For illustration purposes only, mounting assembly 30 is shown in an exploded view. Mounting assembly 30 may include any suitable method for securing a strap to a wall. For instance, mounting assembly 30 may include nails, hooks, screws, adhesives, studs, magnets, and the like. In an embodiment as illustrated, mounting assembly 30 includes a bond stud 100, which secures bracket 125 of release assembly 35 within the vehicle. In an embodiment in which bond stud 100 secures bracket 125 to a steel surface inside the vehicle, the surface of the steel may be prepared and then bond stud 100 may be allowed to cure on the steel. In some embodiments, a bushing 105 slides over bond stud 100. Other embodiments also include mounting assembly 30 including other securing means such as washer 110, lock washer 115, and nut 120. Without limitation, with mounting assembly 30 including bond stud 100, the vehicle surface does not need to be welded or drilled to secure seat 20, which provides a reinforced substrate strength and facilitates corrosion resistance. Further, without limitation, welding or drilling on armor plate steel may compromise the integrity of the armor system.

As shown in FIG. 5, release assembly 35 includes latch and base release 130 and release strap 135. In the embodiment as shown, mounting assembly 30 secures release assembly by securing bracket 125 to the vehicle, with the bracket 125 attached to latch and base release 130 by tether 25. Release assembly 35 has another bracket 125 on the opposing end of release assembly 35 to secure release assembly 35 to strap 40 (not illustrated). A sufficient pulling force applied to release strap 135 releases latch and base release 130, releasing strap 40 from mounting assembly 30. Without limitation, release assembly 35 provides a quick release mechanism. Strap may be re-attached to mounting assembly 30 by re-connecting latch and base release 130 together. In an embodiment, release strap 135 has a reflector 140. Reflector 140 includes any reflective material that is suitable for attachment to a strap 40 and for use in a military vehicle. Without limitation, reflector 140 improves the visibility of release strap 135. It is to be understood that release assembly 35 is not limited to the embodiment illustrated in FIG. 5 but may include any other mechanisms suitable for allowing such a quick release. In an embodiment, release assembly 35 is a quick release mechanism of the type referred to as an ejector hook for use in the parachute industry.

Figure 6:
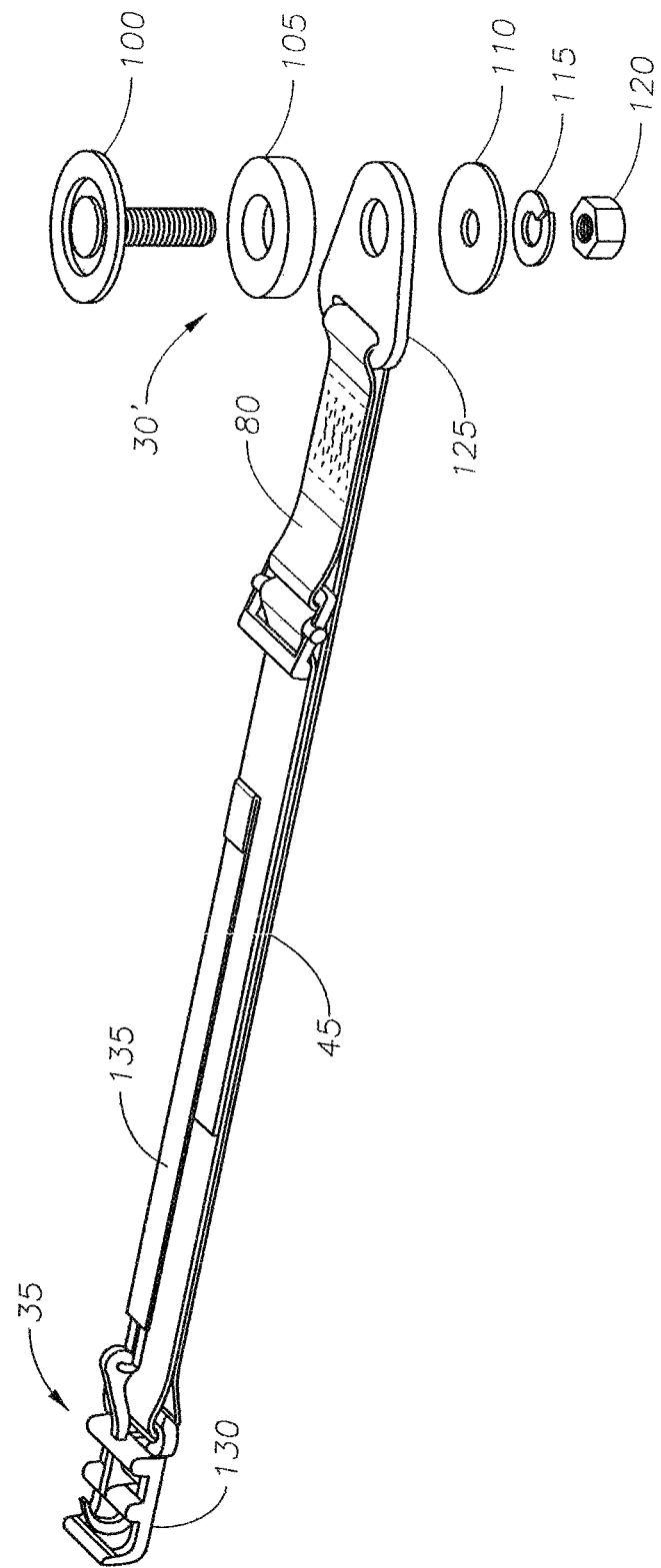
FIG. 6 illustrates a mounting assembly, mounting strap, and a release assembly.

FIG. 6 illustrates an embodiment in which mounting assembly 30' is attached to mounting strap 45 with release assembly 35 attached to mounting strap 45 on the opposing end from mounting assembly 30'. For illustration purposes only, mounting assembly 30 is shown in an exploded view. In an embodiment as shown, mounting strap 45 has a length that is adjustable by adjusting means 80. Bond stud 100 passes through bracket 125 to secure mounting strap 45, with the opposing end of mounting strap 45 secured to release assembly 35. As shown in FIG. 1, strap 40 is secured to the opposing end of release assembly 35 from mounting strap 45.

Figure 7:
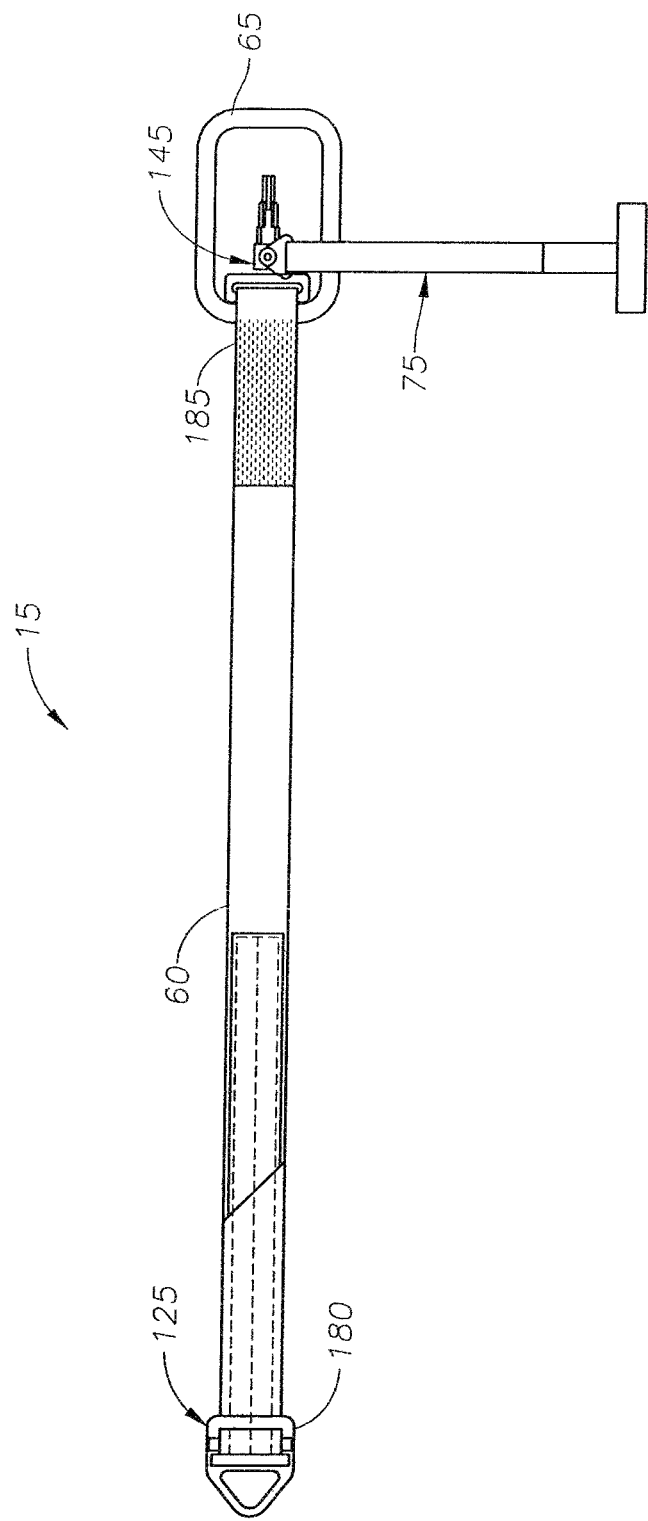
FIG. 7 illustrates a front view of a restraint harness belt.

FIG. 7 illustrates an embodiment of restraint harness belt 15 in which restraint harness belt 15 has belt strap 60 and bracket 125. Belt strap 60 has bracket 125 secured to one end and belt release 145 secured to the opposing end of belt strap 60. Belt release 145 is any mechanism suitable for receiving bracket 125 and securing ends 180 and 185 together. It is to be understood that restraint harness belt 15 is not limited to bracket 125 and belt release 145 but may include any other suitable means for attaching ends 180 and 185 together. In an embodiment as shown, belt strap 60 has an adjustable length, which allows belt strap 60 to be adjusted to the waist of the individual to suitably secure the individual in soldier restraint system 5. In an embodiment as illustrated in FIG. 7, pull strap 75 is attached to the release mechanism of belt release 145. A suitable pulling force applied to belt strap 75 activates the release mechanism and releases bracket 125 from belt release 145. Without limitation, belt strap 75 provides a quick release of restraint harness belt 15 and allows the individual to exit restraint harness belt 15 quickly. In an embodiment as illustrated in FIG. 7, restraint harness belt 15 has belt pad 65. Belt pad 65 may have any configuration and size suitable for providing a cushion between the individual and bracket 125 and belt release 145 when secured to each other.

FIGS. 1 and 2 illustrate an embodiment of soldier restraint system 5 in which restraint harness belt 15 is attached to seat assembly 10 by tethers 55. The tethers 55 may be secured to any suitable part of seat assembly 10. In an embodiment, tethers 55 are secured to straps 40 and/or seat 20. Tethers 55 are also secured to belt strap 60. Tethers 55 may be secured to belt strap 60 at any suitable location. In an embodiment, tethers 55 are slidably attached to belt strap 60, which allows the location of tethers 55 to be adjusted. Without limitation, adjusting the location of tethers 55 on belt strap 60 allows their location to be adjusted to take into account an adjustment in the length of belt strap 60. Tethers 55 may be secured to seat assembly 10 by any suitable means. In an embodiment, tethers 55, straps 40, and mounting strap 45 have sufficient tension to maintain the desired suspension of seat 20 to secure the individual within soldier restraint system 5 but also to allow the individual a desired amount of ability to conduct desired tasks (i.e., operate a weapon in the gun turret, lean over, turn body to view outside vehicle, and the like).

Figure 8:
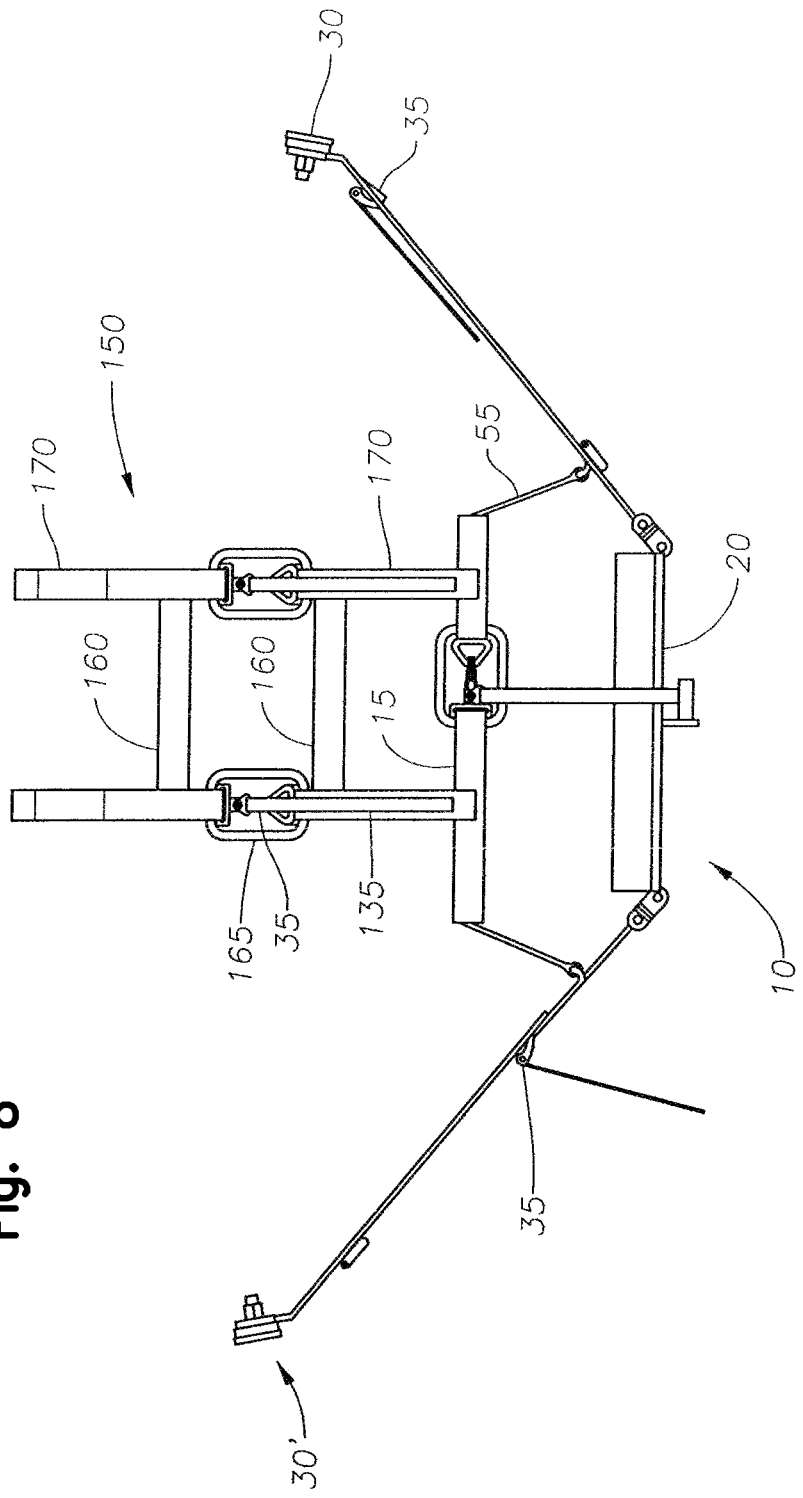
FIG. 8 illustrates a front view of a soldier restraint system having a seat assembly, a restraint harness belt, and a shoulder harness.
Figure 9:
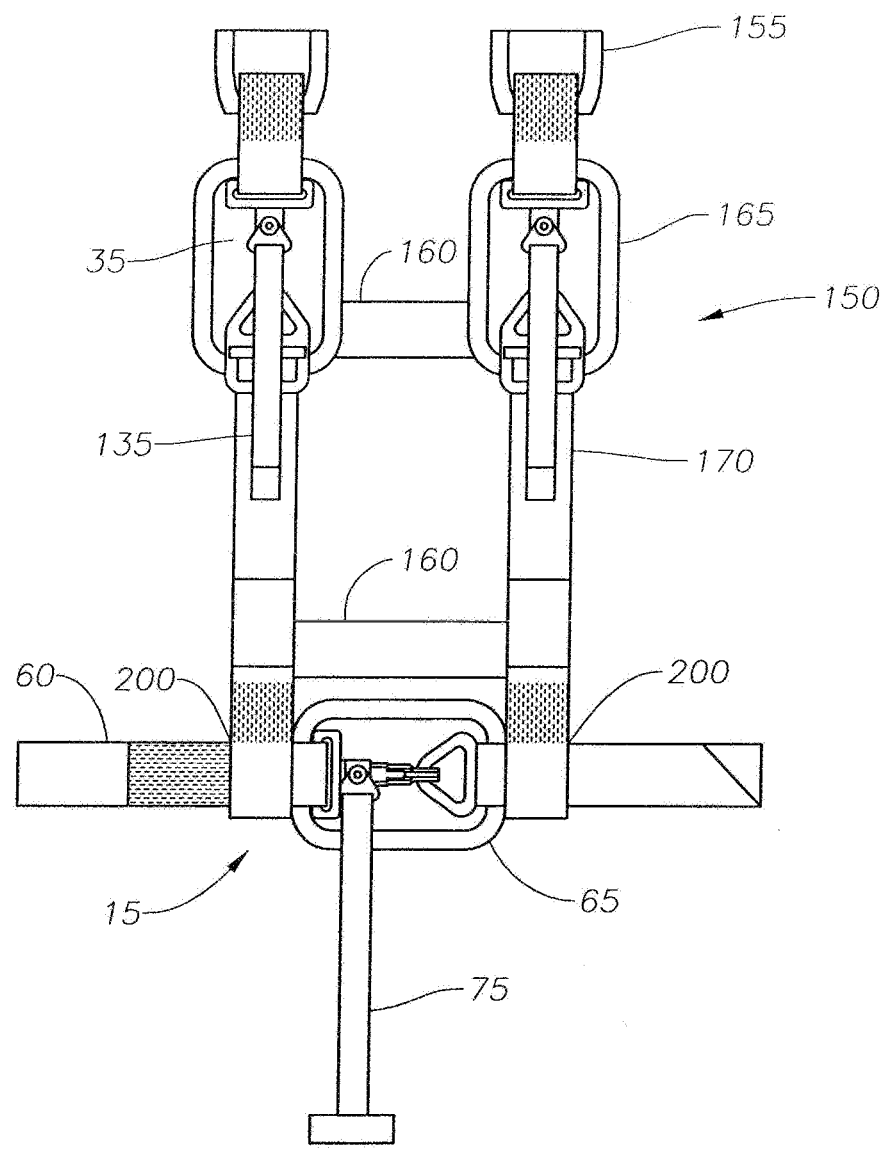
FIG. 9 illustrates a front view of a restraint harness belt and a shoulder harness.

FIG. 8 illustrates an embodiment of soldier restraint system 5 in which shoulder harness 150 is attached to restraint harness belt 15. FIG. 9 illustrates a front view of shoulder harness 150 attached to restraint harness belt 15. Shoulder harness 150 includes shoulder harness straps 170. FIG. 10 illustrates a side view of an embodiment of soldier restraint system 5 having shoulder harness 150. In an embodiment as illustrated, shoulder harness 150 has two shoulder harness straps 170 that are each attached to the front side 190 and back side 195 of restraint harness belt 15. Each shoulder harness strap 170 passes over the shoulder of the individual. Shoulder harness straps 170 have a tension sufficient to secure the individual within soldier restraint system 5 but that also allows the individual to conduct desired tasks. In some embodiments, the width between shoulder harness straps 170 is adjustable. Without limitation, adjusting the width between shoulder harness straps 170 allows the shoulder width of different individuals to be taken into account. The width may be adjusted by any suitable means. In embodiments as illustrated, belt strap 60 passes through loops 200 in each shoulder harness strap 170 to allow adjustment of the width. It is to be understood that shoulder harness 150 is not limited to two shoulder harness traps 170 but in alternative embodiments (not illustrated) may also include more than two shoulder harness straps 170. In embodiments as illustrated, shoulder harness straps 170 each have a release assembly 35. In an embodiment, the release assemblies 35 have release straps 135. In some embodiments, the release assemblies 35 are located in the front of shoulder harness straps 170. Without limitation, locating the release assemblies 35 in the front of shoulder harness straps 170 allows the individual to release the shoulder harness 150, with the release straps 135 allowing a quick release. In alternative embodiments (not illustrated), only one of the shoulder harness straps 170 has a release assembly 35. In some embodiments as illustrated, shoulder harness straps 170 have buckle pads 165, which are disposed between the individual and release assembly 35. Buckle pads 165 may have any configuration and size suitable for providing a cushion between the individual and release assembly 35 when secured to each other. In some embodiments, shoulder harness 150 also includes back supports 160. FIG. 11 illustrates a back view of shoulder harness 150 and restraint harness belt 15 showing back supports 160. Shoulder harness 150 may have any desirable number of back supports 160. In embodiments as illustrated, shoulder harness 150 has a back support 160 in an upper region of shoulder harness 150 and a back support 160 in a lower region of shoulder harness 150. Without limitation, such locations of back supports 160 provide support for the upper and lower back of the individual. Back supports 160 may be composed of any suitable material. In some embodiments as illustrated, shoulder harness straps 170 also have shoulder pads 155. Without limitation, shoulder pads 155 provide a cushion to the shoulders of the individual.

Figure 12:
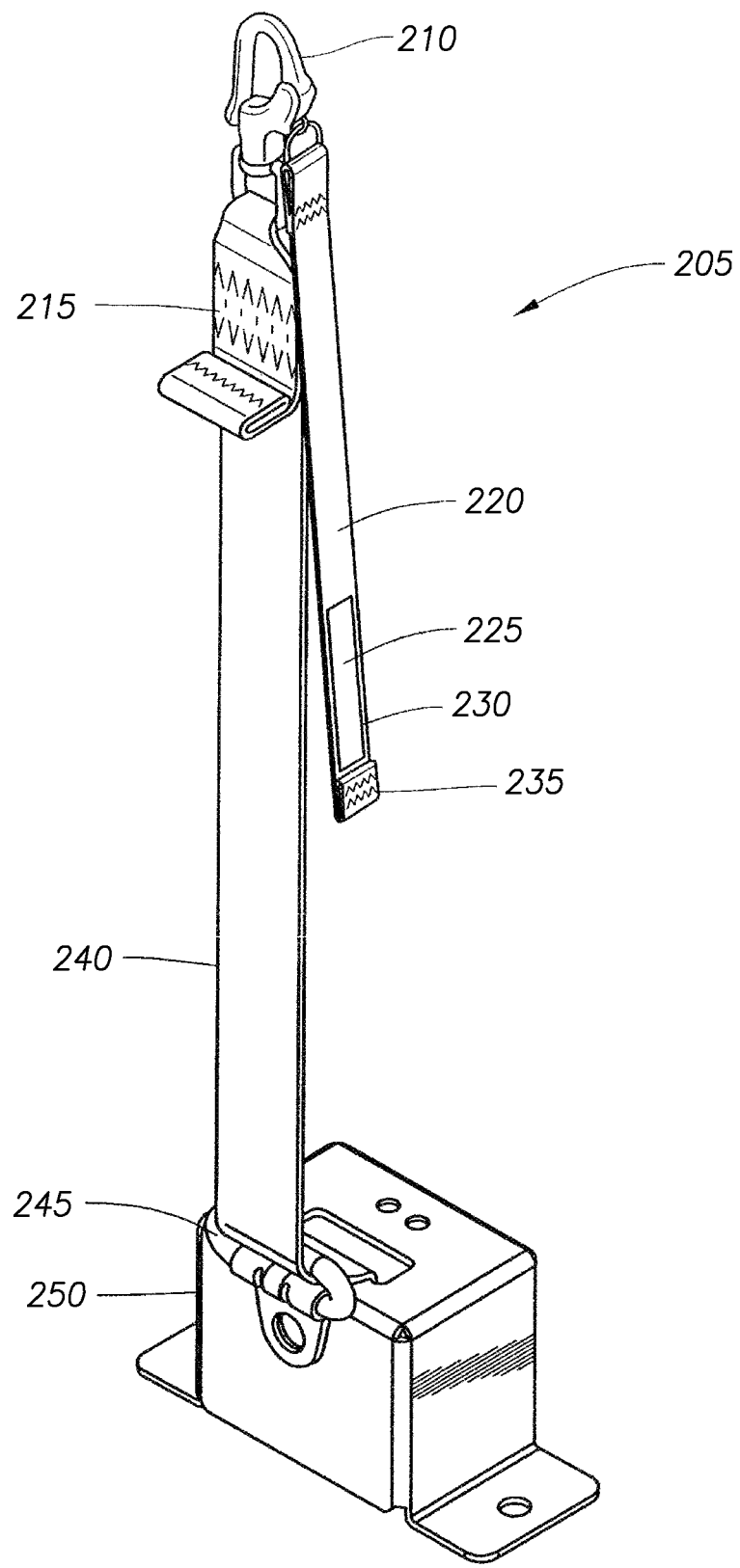
FIG. 12 illustrates an embodiment of a ratchet platform attachment means.

In an embodiment, soldier restraint system 5 further includes soldier restraint attachment means 205. FIG. 12 illustrates an embodiment of soldier restraint attachment means 205. Soldier restraint attachment means 205 includes any means suitable for attachment to seat assembly 10, restraint harness belt 15, or shoulder harness 150. In alternative embodiments, soldier restraint attachment means 205 may be attached to an individual (i.e., soldier) disposed in soldier restraint system 5. In an embodiment as illustrated in FIG. 12, soldier restraint attachment means 205 includes retractor strap 240, strap retractor 250 and release hook 210. Strap retractor 250 is a device suitable for retracting retractor strap 240 and for allowing extraction of retractor strap 240 from strap retractor 250. Strap retractor 250 may be disposed at any location in the vehicle. In an embodiment, strap retractor 250 is attached to the floor or a wall of the vehicle. Strap retractor 250 may be attached to the vehicle by any suitable means such as by screws, bolts, welding, or adhesive. In an embodiment, strap retractor 250 is bolted to a floor of the vehicle.

In embodiments, strap retractor 250 retracts retractor strap 240 upon strap thresholds being identified as achieved. Strap thresholds include any suitable criteria for retraction of retractor strap 240. In an embodiment, the strap thresholds include angle, acceleration, temperature, or any combination thereof. In embodiments, the strap thresholds are adjustable. For instance, without limitation, the strap thresholds may be adjusted according to the terrain or use of soldier restraint system 5. The angle may be any desirable angle. It is to be understood that angle refers to a degree of tilt of the vehicle in which soldier restraint system 5 is secured. In embodiments, the angle is above about 33 degrees, alternatively above about 37 degrees, alternatively above about 40 degrees, and alternatively above about 43 degrees. In some embodiments, soldier restraint system 5 includes an angle sensor mechanism. The angle sensor mechanism may be disposed at any suitable location on the vehicle or on soldier restraint system 5. In embodiments, strap retractor 250 includes the angle sensor mechanism. The angle sensor mechanism may include any type of sensor that determines the angle of tilt of the vehicle. The acceleration may include any desirable acceleration of the extraction of retractor strap 240 from strap retractor 250. In embodiments, strap retractor 250 includes a sensor that determines the acceleration of the extraction of retractor strap 250. As an example, without limitation, the strap threshold for strap retractor 250 is set to above about 43 degrees. Upon the angle sensor mechanism sensing the vehicle exceeding an angle of about 43 degrees, strap retractor 250 retracts retractor strap 240 and thereby retracts the individual (i.e., soldier). Without limitation, an example of strap retractor 250 is a seat belt retractor (i.e., a seat belt retractor used in automobiles but with sufficient strength to retract the individual).

The threshold temperature may be any desirable temperature. In an embodiment, the temperature threshold is above about 250° F., alternatively above about 300° F. The temperature threshold may be determined by any suitable means. In an embodiment, the temperature threshold is determined by one or more temperature sensors that measure the temperature on an outside or inside location of the vehicle. For instance, without limitation, if an explosive device contacts the vehicle, the temperature sensor will determine the increased temperature from the explosive device.

Figure 14:
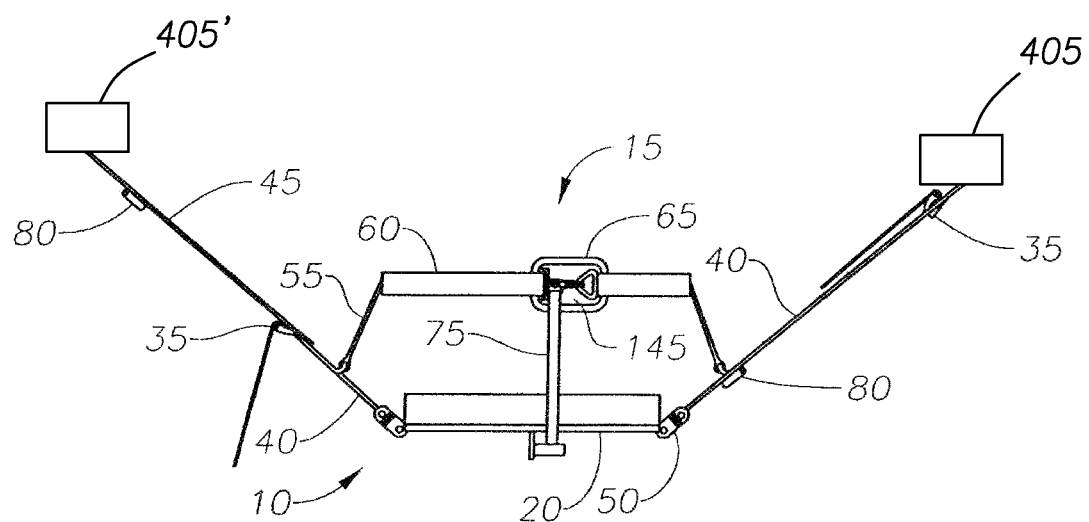
FIG. 14 illustrates a front view of an embodiment of a soldier restraint system having retractor devices.

In an embodiment as shown in FIG. 14, soldier restraint system 5 has retractor devices 405, 405' instead of mounting assemblies 30, 30'. Retractor devices 405, 405' are similar to strap retractor 250. In an embodiment as shown, strap 40 is retractable and/or extendable by retractor device 405, and mounting strap 45 is retractable and/or extendable by retractor device 405'. In embodiments, when a strap threshold is achieved, retractor devices 405 and 405' retract the strap 40 and mounting strap 45, respectively. Retractor devices 405, 405' allow extraction of strap 40 and mounting strap 45 until a strap threshold is achieved. In some embodiments, retractor devices 405, 405' limit the extraction (i.e., payout) of strap 40 and/or mounting strap 45. In an embodiment, retractor devices 405, 405' each have a torsion spring that limits extraction of strap 40 and/or mounting strap 45. In some embodiments, retractor devices 405, 405' each have a pin that is actuated by pressure, which allows extraction of strap 40 and/or mounting strap 45. In an embodiment, a sensor measures strap thresholds. In embodiments, the sensor transmits a signal to the retractor devices 405, 405' to retract. In an embodiment, the strap thresholds are the same strap thresholds as for strap retractor 250.

The angle sensor mechanism may be powered by an suitable means such as by battery. In an embodiment, the angle sensor mechanism is electrically connected to the vehicle's electrical system. In such an embodiment, the angle sensor mechanism receives its power from the vehicle's electrical system.

Retractor strap 240 includes any suitable type of strap. For instance, in an embodiment, retractor strap 240 includes a long, narrow strip of pliant material such as webbing. In alternative embodiments (not illustrated), retractor strap 240 is a cable. In an embodiment, retractor strap 240 passes through strap ring 245 before entering and after exiting strap retractor 250. Without limitation, strap ring 245 facilitates extraction and retraction of retractor strap 240. A release hook 210 is attached to the end of retractor strap 240 opposite strap retractor 250. Release hook 210 includes any type of hook suitable for attaching to the individual or to soldier restraint system 5. In an embodiment as illustrated, release hook 210 is a quick release hook with a swivel. In some embodiments, soldier restraint attachment means 205 includes release strap 220. Release strap 220 is attached to release hook 210, and a sufficient pulling force on release strap 220 releases release hook 210. In an embodiment, release strap 220 includes a visual 225. Visual 225 includes any means for increasing visibility of release strap 220. In an embodiment, visual 225 includes fluorescent material. Visual 225 is secured to release strap 220 by any suitable means such as by stitching 230. In an embodiment, release strap 220 also includes grip 235 at the end of release strap 220 opposite the end of release strap 220 attached to release hook 210. In an embodiment, soldier restraint attachment means 205 includes strap adjustment 215. Strap adjustment 215 includes any means suitable for attaching release hook 210 to retractor strap 240 such as VELCRO, which is a registered trademark of Velcro Industries N.V.

Figure 13:
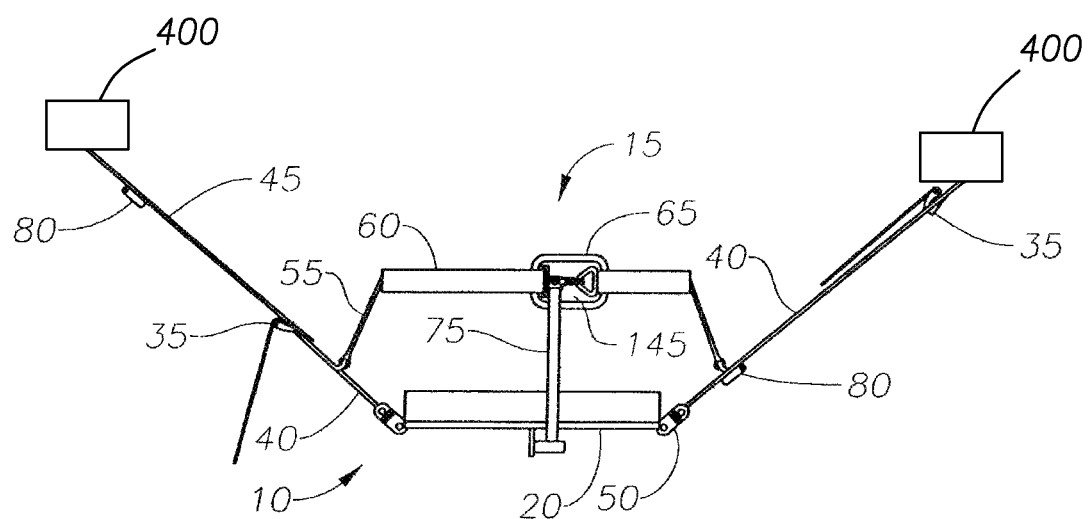
FIG. 13 illustrates a front view of an embodiment of a soldier restraint system having releasable attachments.

In an embodiment as shown in FIG. 13, soldier restraint system 5 includes a release system. The release system includes a release sensor and releasable attachments 400. The release sensor may be disposed at any suitable location within or on the vehicle. In an embodiment, the release sensor is disposed inside the vehicle. In embodiments, the release sensor is disposed in the floor of the vehicle. In an embodiment, the release sensor includes a transmitter. The transmitter sends a signal to the releasable attachments when the release sensor measures that a strap threshold is achieved. In an embodiment, the signal is for the releasable attachments to release from their attachment to the vehicle. The release sensor may be any suitable type of sensor for sensing tilt. In an embodiment, the release sensor is an angle sensor mechanism. In an embodiment, the tilt is the degree of tilt of the vehicle. The tilt may be any suitable degrees. In embodiments, the tilt is an angle (i.e., tilt of the vehicle) above about 33 degrees, alternatively above about 37 degrees, and alternatively above about 40 degrees, and alternatively above about 43 degrees. Releasable attachments 400 are attachable to the vehicle. Releasable attachments 400 are attachable to the vehicle by any suitable means. In an embodiment, releasable attachments 400 are attachable to the vehicle by magnetic induction. Releasable attachments 400 are attachable to any suitable location inside of the vehicle. In embodiments, releasable attachments 400 are attachable to a wall or walls inside the vehicle. In an embodiment of operation of the release system, the release sensor measures a strap threshold. In an embodiment, the strap thresholds are the same strap thresholds as for the embodiments of strap retractor 250. If a strap threshold is measured at or above a desired strap threshold, the release sensor transmitter sends a signal to releasable attachments 400 to release from the attachment to the vehicle (i.e., reduce or turn off the magnetic induction). In some embodiments, strap retractor 250 then retracts retractor strap 240 and thereby retracts the individual (i.e., soldier). In embodiments, the release system includes two releasable attachments 400. In alternative embodiments (not illustrated), the release system has one releasable attachment 400 or more than two releasable attachments 400. FIG. 13 illustrates an embodiment in which soldier restraint system 5 has two releasable attachments 400.

Figure 15:
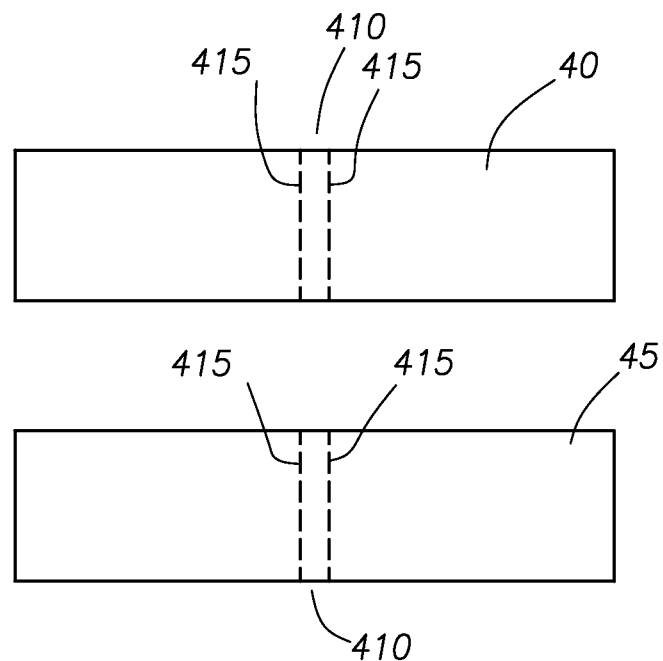
FIG. 15 illustrates a top view of an embodiment of a strap and a mounting strap having breakaway stitching.
Figure 16:
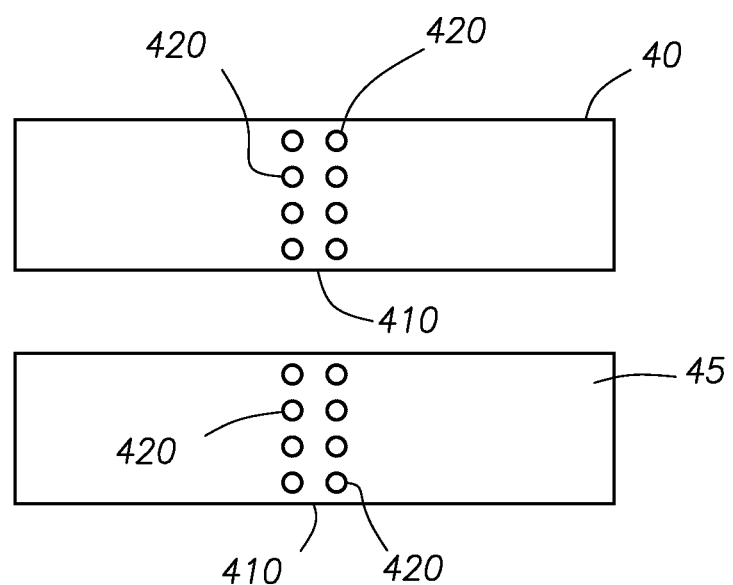
FIG. 16 illustrates a top view of an embodiment of a strap and a mounting strap having rivets.

In embodiments as shown in FIGS. 15 and 16, strap 40 and/or mounting strap 45 have one or more sections 410 of folded strap. As shown in FIG. 15, the folded strap is held together by breakaway stitching 415. As shown in FIG. 16, the folded strap is held together by rivets 420. In some embodiments (not illustrated), the folded strap has breakaway stitching 415 and rivets 420. The breakaway stitching 415 and/or rivets 420 release when the strap 40 or mounting strap 45 exert a pressure upon the breakaway stitching 415 and/or rivets 420 that is at or above a set pressure. For instance, the pulling pressure applied to a strap 40 is about at or exceeds the set pressure of breakaway stitching 415. Breakaway stitching 415 then breaks and releases, allowing the folded strap 40 to extend out. Further, for instance, the pulling pressure applied to a strap 40 is about at or exceeds the set pressure of rivets 420. Rivets 420 then release, allowing the folded strap 40 to extend out.

Figure 17:
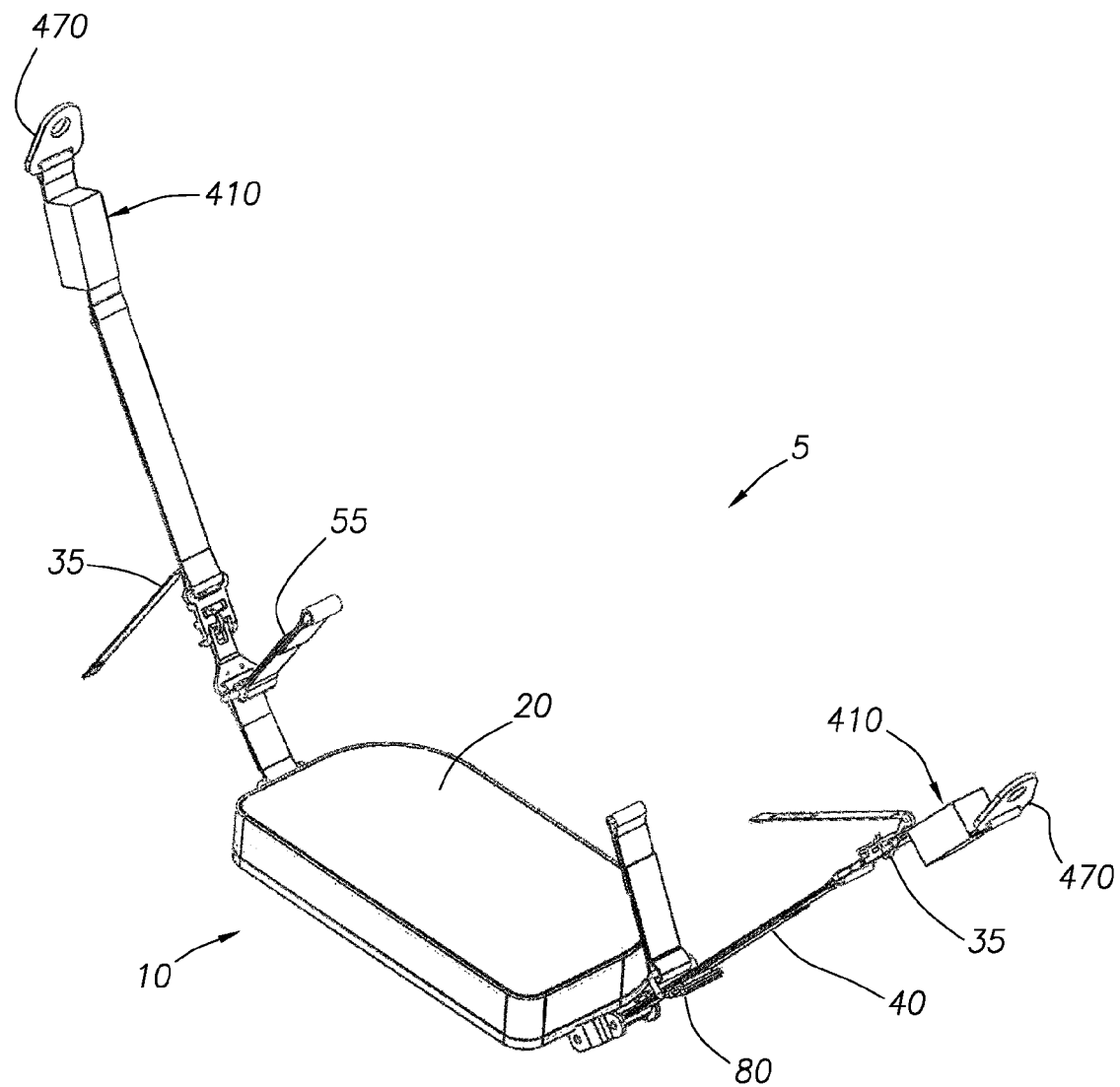
FIG. 17 illustrates a perspective view of an embodiment of a soldier restraint system having a container.

In embodiments as shown in FIG. 17, section 410 is a container in which portions of strap 40 or mounting strap 45 are disposed within. Such portions of strap 40 and mounting strap 45 may be folded, rolled, or any other suitable disposition means within section 410. Such portions of strap 40 and mounting strap 45 may be pulled out of section 410. In some embodiments, strap 40 and mounting strap 45 may be placed back into section 410 after being pulled out. Section 410 is attached to the vehicle (i.e., wall of the vehicle) by any suitable means such as by bolts, screws, mounting assemblies 30 and 30', and releasable attachments 400. In an embodiment as shown, sections 410 are attached to the vehicle by brackets 470. Brackets 470 may be screwed, bolted, and the like to the vehicle.

The extension and retraction embodiments of FIGS. 14-17 provide energy attenuation to soldier restraint system 5. Without limitation, a soldier disposed in soldier restraint system 5 may be exposed to less energy by action of such energy attenuation.

The vehicle in which soldier restraint system 5 is secured may include any vehicle such as a truck, car, military vehicle, helicopter, air plane, and the like. In an embodiment, the vehicle is a military vehicle.

It is to be understood that soldier restraint system 5 is not limited to soldiers but may be used for any type of individual.

Although the present invention and its advantages have been described in detail, it should be understood that various changes, substitutions and alterations may be made herein without departing from the spirit and scope of the invention as defined by the appended claims.

What is claimed is:

1. A soldier restraint system in a vehicle, comprising:
a seat assembly comprising a seat and straps;
a restraint harness belt, wherein the restraint harness belt is secured to the seat assembly;
mounting assemblies, wherein the seat assembly is suspended by the straps, and wherein the straps attach the seat to the mounting assemblies, and wherein the mounting assemblies are securable to the vehicle, and wherein the mounting assemblies comprise swivel brackets, and wherein the swivel brackets allow the seat to move, and further wherein attachment of at least one of the straps to the seat is releasable by a quick release assembly; and
a strap retractor and a retractor strap, wherein the retractor strap is extractable from the strap retractor, and wherein the retractor strap is retractable by the strap retractor, and wherein the strap retractor retracts the retractor strap upon achieving a strap threshold.

2. The soldier restraint system of claim 1, further comprising a release system, wherein the release system comprises a release sensor and a releasable attachment.

3. The soldier restraint system of claim 1, wherein the strap threshold comprises angle, acceleration, temperature, or any combinations thereof.

4. The soldier restraint system of claim 3, wherein the temperature is above about 250° F.

5. The soldier restraint system of claim 3, wherein the angle is above about 43 degrees.

6. The soldier restraint system of claim 3, wherein the strap threshold is measured by a sensor.

7. The soldier restraint system of claim 6, wherein the vehicle comprises an electrical system, and wherein the sensor is connected to the electrical system.

8. The soldier restraint system of claim 1, wherein the vehicle comprises a floor, and wherein the strap retractor is secured to the floor.

9. The soldier restraint system of claim 1, wherein the mounting assemblies comprise retractor devices.

10. The soldier restraint system of claim 9, wherein the retractor devices retract and/or extend the straps.

11. The soldier restraint system of claim 10, wherein the retractor devices retract the straps when a strap threshold is achieved.

12. The soldier restraint system of claim 1, further comprising a shoulder harness, wherein the shoulder harness is attached to the restraint harness belt.

13. The soldier restraint system of claim 12, wherein the shoulder harness comprises shoulder harness straps.

14. The soldier restraint system of claim 13, wherein each of the shoulder harness straps comprises release assemblies.

15. The soldier restraint system of claim 1, wherein the restraint harness belt comprises a belt release and a pull strap, wherein the pull strap releases the belt release.

16. A soldier restraint system in a vehicle, comprising:
a seat assembly comprising a seat and straps;
a restraint harness belt, wherein the restraint harness belt is secured to the seat assembly;
mounting assemblies, wherein the seat assembly is suspended by the straps, and wherein the straps attach the seat to the mounting assemblies, and wherein the mounting assemblies are securable in the vehicle, and wherein the mounting assemblies comprise swivel brackets, and wherein the swivel brackets allow the seat to move, and further wherein attachment of at least one of the straps to the seat is releasable by a quick release assembly; and
one or more sections, wherein the one or more sections comprise portions of folded strap.

17. The soldier restraint system of claim 16, wherein the portions of folded strap comprise breakaway stitching.

18. The soldier restraint system of claim 16, wherein the portions of folded strap comprise rivets.

19. The soldier restraint system of claim 16, wherein at least one of the sections comprises a container.

20. The soldier restraint system of claim 19, wherein the portions of folded strap are disposed within the container.

* * * * *